United States Patent
Veyseh et al.

(10) Patent No.: US 10,334,602 B2
(45) Date of Patent: *Jun. 25, 2019

(54) COMMUNICATIONS BETWEEN CONNECTED DEVICES

(71) Applicant: SiTune Corporation, San Jose, CA (US)

(72) Inventors: Marzieh Veyseh, Los Altos, CA (US); Vahid Mesgarpour Toosi, Mountain View, CA (US)

(73) Assignee: SiTune Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/925,181

(22) Filed: Mar. 19, 2018

(65) Prior Publication Data

US 2018/0295623 A1  Oct. 11, 2018

Related U.S. Application Data

(63) Continuation of application No. 14/586,492, filed on Dec. 30, 2014, now Pat. No. 9,924,514.

(51) Int. Cl.
*H04W 72/04* (2009.01)
*H04W 84/18* (2009.01)

(52) U.S. Cl.
CPC ........ *H04W 72/0453* (2013.01); *H04W 84/18* (2013.01)

(58) Field of Classification Search
CPC .................. H04W 72/0453; H04W 84/18
See application file for complete search history.

(56) References Cited

U.S. PATENT DOCUMENTS

| 9,924,514 B2* | 3/2018 | Veyseh ............ H04W 72/0453 |
| 2005/0053015 A1 | 3/2005 | Ho et al. |
| 2008/0214238 A1* | 9/2008 | Rokusek ............... H04B 1/034 455/557 |
| 2011/0152970 A1 | 6/2011 | Jollota et al. |
| 2012/0176974 A1 | 7/2012 | Abraham et al. |
| 2013/0023214 A1 | 1/2013 | Wang et al. |
| 2016/0088484 A1 | 3/2016 | Yang et al. |

OTHER PUBLICATIONS

Non-Final Rejection issued in U.S. Appl. No. 14/586,492 dated Jun. 15, 2016.
Final Rejection issued in U.S. Appl. No. 14/586,492 dated Jan. 18, 2017.
Non-Final Rejection issued in U.S. Appl. No. 14/586,492 dated Jul. 31, 2017.
Notice of Allowance issued in U.S. Appl. No. 14/586,492 dated Dec. 13, 2017.

* cited by examiner

*Primary Examiner* — Christopher M Crutchfield
*Assistant Examiner* — Tito Q Pham
(74) *Attorney, Agent, or Firm* — Hogan Lovells US LLP

(57) ABSTRACT

Embodiments relate generally to method, system and apparatus for wireless communications between multiple wireless sensor nodes for wireless sensor networks. More specifically, disclosed are system and method that enable wireless communications between devices using different wireless transmission protocols, via one or more multi-channel intermediate devices.

20 Claims, 5 Drawing Sheets

US 10,334,602 B2

COMMUNICATIONS BETWEEN CONNECTED DEVICES

RELATED APPLICATION

This application is a continuation of U.S. patent application Ser. No. 14/586,492, entitled "COMMUNICATIONS BETWEEN CONNECTED DEVICES" filed Dec. 30, 2014, which is now issued as U.S. Pat. No. 9,924,514, and which is incorporated in entirety herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments relate generally to multi-channel communications between sensor nodes for wireless sensor networks. More specifically, disclosed is system and methods that enable wireless communications between devices using different wireless transmission protocols.

BACKGROUND

The future of devices (e.g., computing devices such as computers, cameras, appliances, etc.) or other objects will change by the ability to communicate with other devices and the World Wide Web. For example, the Internet of Things (IoT) is the idea where devices in environments such as home automation, health care, emergency response, intelligent shopping, smart product management, environmental sensing, smart meters, waste management, urban planning can communicate with other devices and the World Wide Web. The devices in these environments communicate using protocols that can enable many devices to connect to a network and communicate in an efficient and reliable way. One challenge is to add connections within one contention region (where wireless devices' are physically close enough that their transmission may interfere with each other) when the available network spectrum is limited.

For example, for devices to connect, they usually need to use a portion of the spectrum (e.g., wireless band) to send messages to an appropriate receiver. However, when other devices within the same contention region also attempt to access the spectrum, there will be increasing collisions and access delay as the number of devices increase. As more devices attempt to access the same spectrum, the more contention is created and, as a result, connection attempts can fail. These issues and similar issues can be worse when devices use popular wireless bands such as the Industrial, Scientific and Medical Radio Band of 2.4 GHz which is also used by other standards based on different channel definition within the band. For this band, IEEE 802.11 and IEEE 802.15.4 share the spectrum and avoid collisions by switching channels in such a way that there is no overlap among the utilized channels around neighboring devices. This feature is called "frequency agility" and is defined in ZigBee RF4CE Specification Version 1.01. However, devices that use the same standard are usually required to stay on the same channel. This means contention will not be controlled among nodes using 802.15.4 standard.

Thus, there is a need to manage better use of spectrum when multiple channels are available within a single standard (or various standards) and can be distributed among devices to reduce contention among neighboring nodes.

SUMMARY

Aspects of the exemplary embodiments may include a transceiver radio for a wireless hub including an RF front end receiver that can capture, demodulate and decode a pre-defined band entirely as well as medium access algorithms for managing channel access when multiple users try to access the band; as well as a transceiver radio for a sensor device including updated medium access control algorithm that can communicate with the aforementioned hub in order to efficiently access the spectrum while reducing contention.

The RF front end radio at the hub can capture messages sent over the pre-defined band when messages are sent over non-overlapping channels and each channel is occupying a different part of the spectrum. Using this Radio, the need to implement multiple RF front ends is eliminated. Utilizing the offered communication system for Home Automation, health care, emergency response, intelligent shopping etc. results in larger network density (more number of nodes within the same geographical area), reduced transmission delay, and energy conservation.

According to some embodiments, the present technology includes a computer-implemented method comprising the following steps. First, receiving, at a hub in communication with at a plurality of computing nodes, a first plurality of available communication channel lists, each one of the available communication channel list being generated by one of the plurality of computing nodes. Secondly, determining one or more channels unavailable for the hub determining, based at least in part on the one or more channels unavailable for the hub, a second plurality of available communication lists, each one of the available channel lists associated with one of the plurality of computing nodes. Thirdly, sorting, according to numeric values of the second plurality of available communication lists, the plurality of computing nodes to form a sorted plurality of computing nodes in an ascending order. Lastly, selecting a communication channel for each of the plurality of computing nodes based on the sorted plurality of computing nodes in the ascending order.

BRIEF DESCRIPTION OF THE DRAWINGS

Various embodiments or examples of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

The future of the objects in the world will change by the ability to communicate to other objects and the World Wide Web. In this way, most devices (e.g., TVs, appliances, lightings, etc.) will have sensors, actuators, and transceivers and have the ability to communicate with each other. For various applications such as home automation devices can make decisions based on information they receive from other devices without the involvement of the network owner. For instance, the coffee maker can start making coffee when the motion sensor detects movement near the kitchen in the morning time, or the hallway lights turn on before the front door is open. All the "things" we deal with daily can become smart and make our lives easier. To achieve this, these devices need to communicate wirelessly with each other.

The present technology enables a coordinator or a centralized hub that can connect to and communicate with numerous devices. The hub is connected to the web and control devices such as smart phones or smart tablets. The control devices can directly communicate with the hub and coordinate the connected devices via applications.

Figure 1:
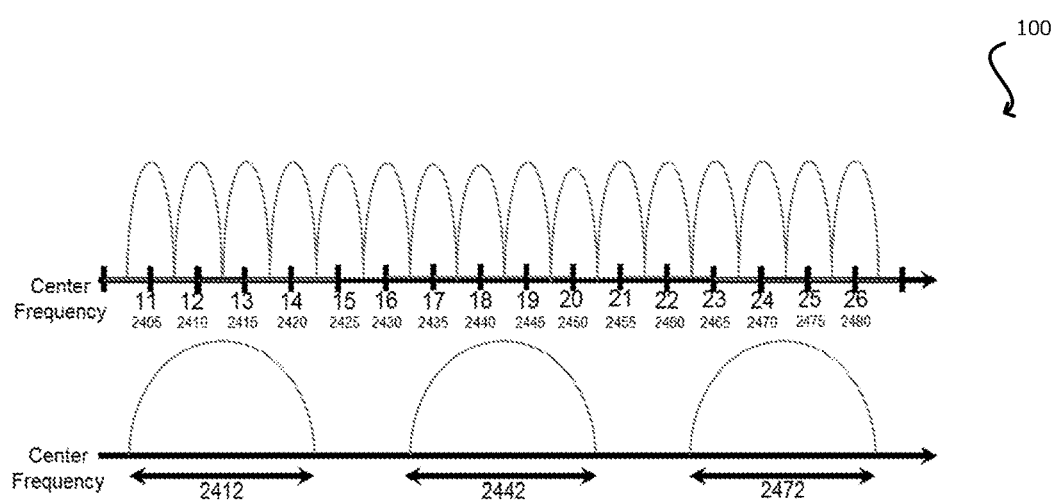
FIG. 1 illustrates channel definition for 802.15.4 on the top and 802.11 at the bottom for 2.4 GHz band in accordance with an embodiment.

As shown in FIG. 1, one present problem is that many of the popular standards designed and reserved for a platform (exp. IEEE 802.11 and 802.15.4) share wireless bands. The wireless band is usually divided into multiple channels. For each standard, different channel definitions are introduced. For network nodes, the available band/spectrum is shared among all neighbors when their radio use a wireless standard based on that spectrum. Typically, only one channel can be used by each node for any popular IoT standards. Therefore, multiple nodes using the same standard have to compete for the same channel or similar channels; while other nodes based other standard compete for their designated channels.

To avoid interference, these competing nodes from different standards should avoid using the same channels. Meanwhile, sharing only one channel by nodes that utilize the same standard means that there will be contention. Contention is the main limitation when it comes to increasing network density by number of nodes and reducing transmission delay. Transmission delay is the transmission time for a message from entering a node's transmission queue to being received by the receiver's radio.

The present technology utilizes the available band efficiently so that computing nodes can use different parts of the available band concurrently to reduce contention. As a result, more nodes can be added to the network without causing much transmission delays. The present technology solves the problem that coordinators and hubs can only capture and receive a single transmission over a single channel for IoT standards, and the nodes need to share this single channel via Carrier Sense Multiple Access with Collision Avoidance (CSMA/CA). In accordance with various embodiments, when CSMA/CA is used as the medium access technique, the average throughput (i.e., the number of successfully received bits) per node decreases as number of neighboring nodes (i.e., density) increases to the point that it will reach to zero as density approaches its maximum possible value.

Aspects of the exemplary embodiments may include a transceiver radio including an RF front end receiver that can capture, demodulate and decode a pre-defined band entirely as well as medium access algorithms for managing channel access when multiple users try to access the band. The RF front end radio can capture messages sent over the pre-defined band concurrently when messages are sent over non-overlapping channels and each channel is occupying a different part of the spectrum. Using this Radio, the need to implement multiple RF front ends is eliminated (which is limited in terms of number of possible radios and difficult to attain).

The network of nodes is clustered to groups. In each group there is one root and some children. The children in each cluster produce data and send their information to the root of that cluster. The roots can also create clusters among themselves and create a hierarchy of clusters in order to eventually send the gathered data back to the coordinator which acts as the sink for all the gathered data.

The invention includes a channel assignment algorithm. The network can be clustered depending on the transmission range of the nodes and the channel assignment algorithm is implemented at the root of each cluster. The root collects messages from its children and re-sends them to the further away root if the transmission range of the original senders is shorter than their distance to the coordinator/top root. Also children can use less power to transmit data to the closer root compared to the further away coordinator even if the transmission range can support the geographical distance. The coordinator can connect the clustered network to the internet and the end user.

For example, one of the major standards used in Internet of Things is 802.15.4. The new algorithm enables implementation of new hubs that allow multiple 802.15.4 devices to use different unoccupied 802.15.4 channels at the same time. The hub can receive and demodulate messages sent over these non-overlapping channels concurrently. The devices that use non-overlapping channels do not need to wait for their turn to send messages to the hub if they are assigned a unique non-overlapping channel for their transmission. This brings about less transmitter active time, faster channel access, and ultimately less power consumption.

According to some embodiment, the channel assignment algorithm can detect and find channels that are available and free to be used by its children, meaning that no other user around that specific child is using the channel for data transmission. According to some embodiments, the channel assignment algorithm can assign free channels to the children and keep channel usage among them as evenly distributed as possible. This means that the algorithm should not assign one channel to too many children while assign another channel to too few children. The goal is to keep contention at a minimum level.

Figure 2:
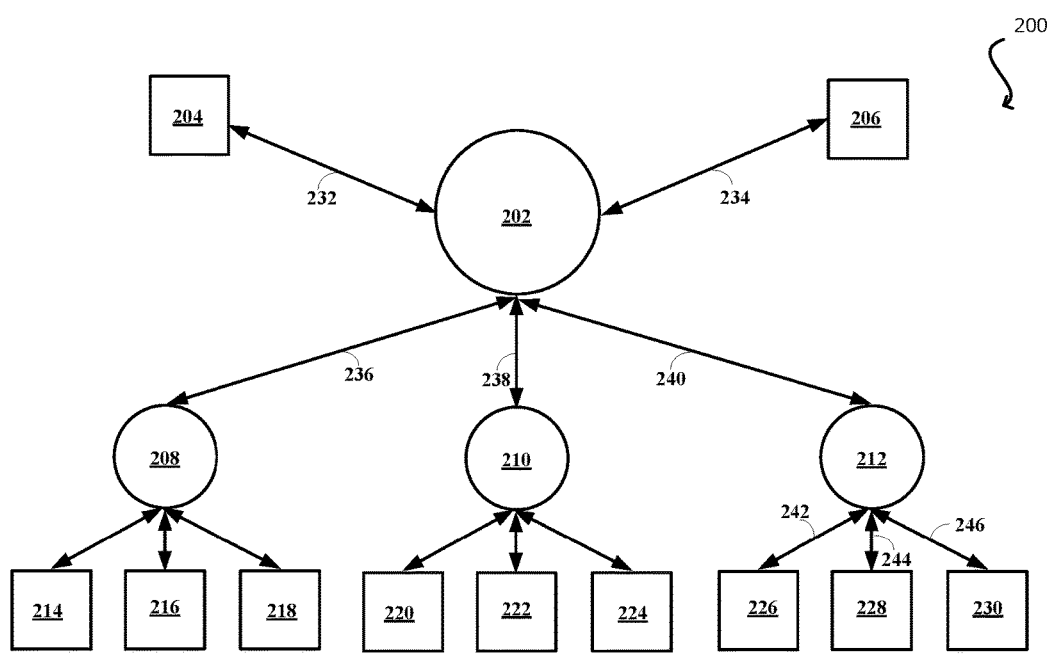
FIG. 2 is a diagram illustrating an example of the network topology in accordance with an embodiment.

FIG. 2 illustrates an example 200 of the network topology when there are multiple nodes that collect information and need to send it back to the coordinator. Generally depending on the distribution of the nodes, coordinator may or may not be within the transmission range of the nodes. In such cases, relaying hubs (roots) need to be deployed to pass the messages to the coordinator. The hubs are special devices equipped with the similar transceiver as the coordinator. The channel allocation algorithm will be applied at both the coordinator and the hubs. Each will run the algorithm independently to choose channels for future transmissions to/from its own children. In the present specification, specific terms such as relaying hubs, roots and coordinators are interchangeable, and specific terms such as children and child nodes are interchangeable.

In FIG. 2, a coordinator or hub 202 can apply algorithm to select channels (e.g. 232, 234, 236, 238 and 240) for multiple child nodes (e.g. 204, 206, 208, 210 and 212). According to some embodiments, child nodes can also serve as relay hubs (e.g. 208, 210 and 212) that can further communicate with one or more child nodes. As shown in FIG. 2, child node or replay hub 212 can run algorithm to select channels (e.g. 241, 244 and 246) for multiple child nodes (e.g. 226, 228 and 230). Additionally, child node or relay hub 208 can communicate with multiple child nodes (e.g. 214, 216 and 218); child node or relay hub 210 can communicate with multiple child nodes (e.g. 220, 222 and 224).

According to some embodiments, each coordinator or hub can individually and independently apply algorithm to select available channels for the associated child nodes. For example, coordinator or hub 202 can apply algorithm to select one non-overlapping channel 232, 234, 236, 238 and 240 and assign each of the channels to each of the associated child nodes 204, 206, 208, 210 and 222. Because these channels are non-overlapping to each other, all child nodes 204, 206, 208, 210 and 212 can concurrently transmit data to coordinator or hub 202.

According to some embodiments, the coordinator or hub can further reduce the contention issue by evenly distributing available channels among all the child nodes. For example, coordinator or hub 202 can avoid assigning one channel to too many or too few child nodes.

Figure 3:
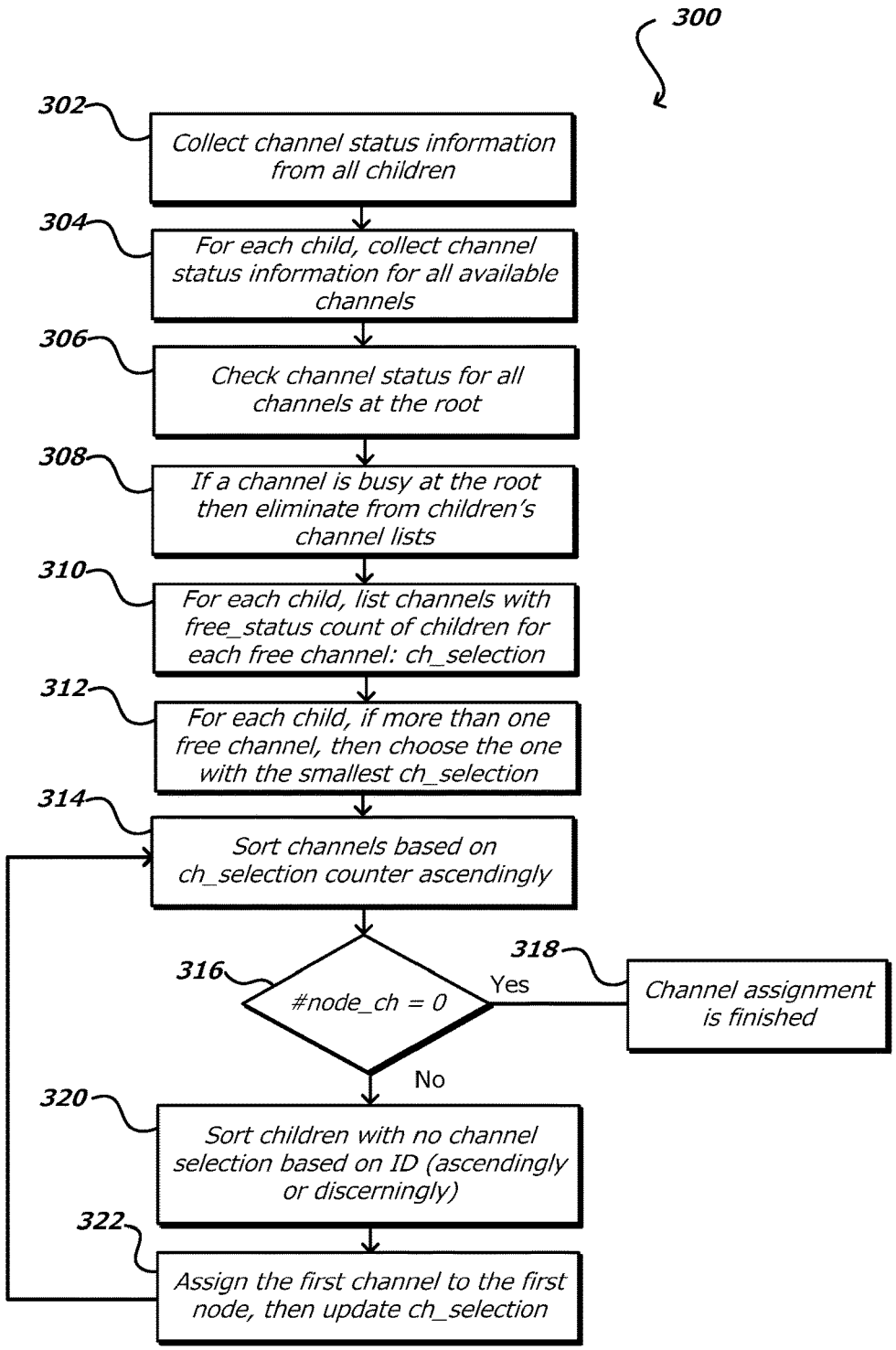
FIG. 3 is an example flow diagram illustrating an example of the proposed algorithm in accordance with various embodiments.

FIG. 3 illustrates an example 300 of the proposed algorithm applied by each root to allocate a channel to each of its children for their future communications with the root. According to some embodiments, the channel selection algorithm starts at 302 when the root starts collecting channel status information from each child one by one. All children use a pre-defined control channel (set by the network designer) and CSMA/CA medium access protocol to send their channel status information to the root. Root needs to collect this information about all channels from all its children. The channel status information collected from each child (it can be collected multiple times to ensure better accuracy) shows two possible answers for each of the available channels: "Busy_status" or "Free_status". Busy_status means that the channel might be used by other neighbors of the sensing child and at the sensing child, the noise level at this specific channel is very high, so it's "Busy".

At step 304, after collecting channel status information from its children, the root checks the status of channels around itself, meaning that it will sense the noise level around itself at each channel and give each channel a Busy or Free flag based on its own measurements. If a channel is Busy around the root, it will be eliminated from the channel assignment algorithm 306, since children cannot transmit on a channel that is already sensed with a high noise level at the receiver (root).

At step 308, the root lists the channel with free status for each child ("Free channel list") and for each channel with a free status, it counts how many children include that channel in their list as a free channel. This counter can be called "ch_selection" counter and can be from 0 to the total number of channels. At the end of this step, each channel has a "ch_counter" associated with it.

At step 310, the root checks the free channel list for each child, and if a child has more than one free channel in its list, one of them should be chosen since only one channel will be assigned to each child. At this step, the root chooses that channel that has the smallest "ch_selection" counter (which means that it has been listed less than the other channel). This ensures uniform selection of channels for children. After each change to the list, the root updates the ch_selection counter for the channels.

At step 312, the root sorts all channels based on their ch_selection counter ascendingly meaning that channels with smallest ch_counter will be first and channels with the largest ch_selection counter will be last. 320 is a checkpoint to see if all children have one channel in their list. If yes, 314 is the finishing step of the algorithm and if not, the algorithm moves to step 316. At this point, the root sorts all the children that have no channels in their list based on their ID (ascendingly or descendingly.) then at 318, it will assign the first channel from the channel list to the first child from the children list. Then ch_selection counter is updated and at 319 the algorithm moves to step 312 where it will sort channels again and goes to the check point 320 to check for the finishing step of the algorithm.

After the root has selected one channel for each child, some children might end up sharing a common channel especially if the number of children is more than the available channels; or if more channels are busy around the root or its children and therefore cannot be used. In this case, the shared channel among the chosen children can be accessed via the CSMA/CA protocol that is well known in the art.

After channel selection algorithm is finished, the root can broadcast its selection table to the children on a pre-defined control channel. This channel is assigned during installation. The message will be acknowledged by the root children to make sure they all have successfully received the information regarding g the chosen channel and they can send info on the assigned channel for the future communication.

For example, the call for channel selection at the root can be applied at one or more of the following situations:
1. At the beginning of network set up;
2. At change of network topology by adding new nodes or extracting nodes; and
3. At error detection algorithm deciding that too many packets are dropped and as a result channel selection should be re-done. The error detection algorithm is run at the transport layer to detect the success rate of packet arrivals at the intended destination.

Figure 4:
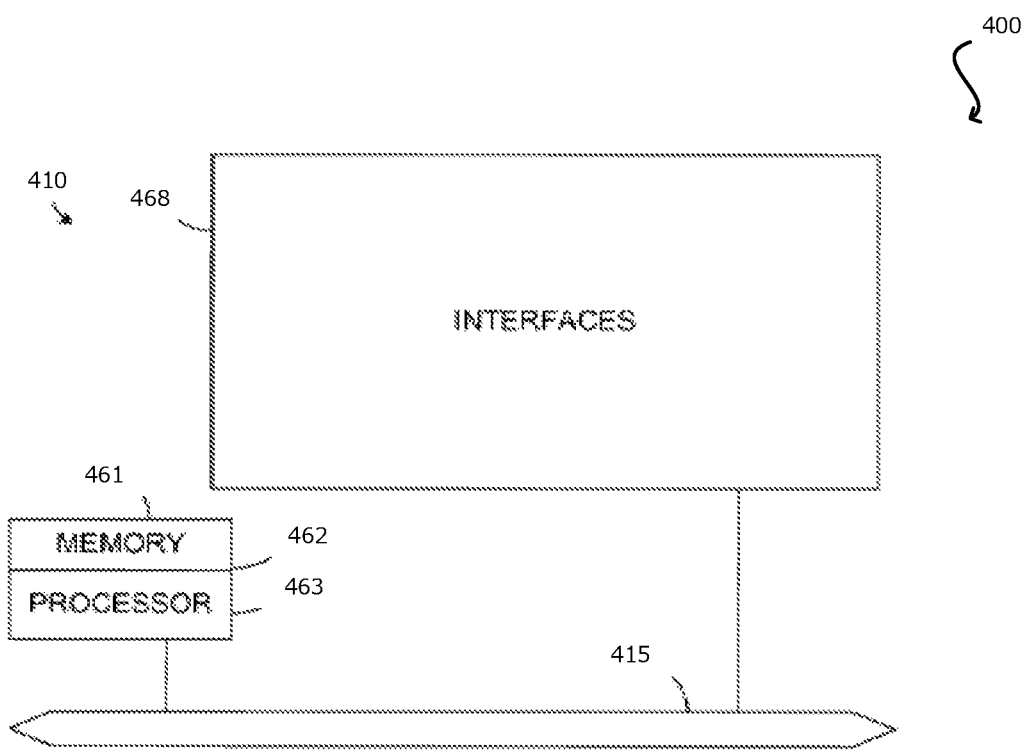
FIG. 4 illustrates an exemplary network device in accordance with an embodiment.

FIG. 4 illustrates example 400 of an exemplary network device 410 suitable for implementing the present invention. Network device 410 includes a master central processing unit (CPU) 462, interfaces 468, and a bus 415 (e.g., a PCI bus). When acting under the control of appropriate software or firmware, the CPU 462 is responsible numerous tasks, at least some of which relate to network management. It preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5:
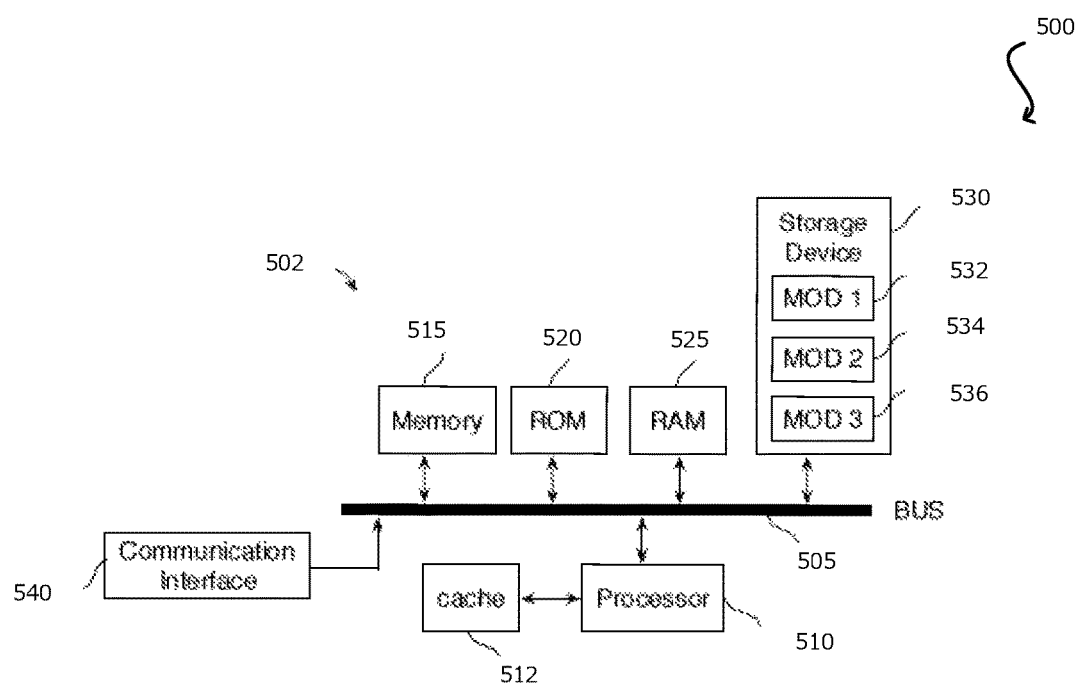
FIG. 5 illustrates an exemplary system in accordance with various embodiments.

FIG. 5 illustrates example 500 of exemplary possible system embodiments, such a system making up network device 410. The more appropriate embodiment will be apparent to those of ordinary skill in the art when practicing the present technology. Persons of ordinary skill in the art will also readily appreciate that other system embodiments are possible. FIG. 5 illustrates a conventional system bus computing system architecture 502 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A processor-implemented method, comprising:
   for an individual node of a plurality of nodes and at a plurality of times points, determining first noise level in a plurality of channels of a frequency band, the plurality of channels available to the individual node;
   determining, in the individual node, that a first set of the plurality of channels is available for transmission at the end of the plurality of time points and based at least in part on the first noise level;
   providing, to a hub, a listing of the first set of the plurality of channels;
   determining, by the hub, that a second set of the plurality of channels, from the first set of the plurality of channels, is unavailable for transmission based at least in part on measurements of second noise level by the hub;
   eliminating, the second set of the plurality of channels from the listing of the first set of the plurality of channels to provide a third set of the plurality of channels;
   determining that additional nodes of the plurality of nodes provided a respective set of the plurality of channels in which respective unavailable channels are eliminated;
   determining that the respective set of the plurality of channels include the third set of the plurality of channels;
   associating count values for the respective set of the plurality of channels; and
   assigning a select channel from the respective set of the plurality of channels to the individual node, the select channel for transmission by the individual node and having an associated count value that is a smallest value from the count values.

2. The processor-implemented method of claim 1, further comprising:
   updating the associated count value and the count values to reflect the assignment of the select channel.

3. The computer-implemented method of claim 1, further comprising:
   determining a channel assignment for each of the plurality of nodes following the assignment of the select channel to the individual node, the channel assignment excluding further assignment of the select channel.

4. The processor-implemented method of claim 3, wherein the channel assignment for individual ones of the plurality of nodes is an ordered process beginning with the select channel assigned to the individual node and continuing with subsequent channels from the respective set of the plurality of channels that have an order of increasing values from the smallest value being assigned to a next node of the plurality of nodes till the individual node is reached.

5. The processor-implemented method of claim 4, further comprising:
   assigning subsequent channels having an order of increasing values from the smallest value to a next node of the plurality of nodes, the assigning causing a change in the count values for the respective set of the plurality of channels;
   determining that there are remaining ones of the plurality of nodes that do not have an assigned channel;
   sorting the respective set of the plurality of channels by changed count values after the assigning of the subsequent channels has been completed to generate a sorted list with a new smallest count value among the changed count values;
   assigning to the remaining ones of the plurality of nodes a channel with the new smallest count value.

6. The processor-implemented method of claim 1, further comprising:
   determining the plurality of channels available to the individual node based at least in part on at least one of a predetermined channel setting or a medium access protocol.

7. The processor-implemented method of claim 1, wherein a coordinator is operable to select a channel from the respective set of the plurality of channels for the individual node over the select channel to reduce contention in data communication.

8. The processor-implemented method of claim 7, the channel selected from the respective set of the plurality of channels for the individual node over the select channel is shared with another node.

9. The processor-implemented method of claim 1, further comprising:
   transmitting, by the individual node, signals that are at least in a frequency range corresponding to the select channel.

10. The processor-implemented method of claim 1, further comprising:
    broadcasting, by the individual node on a pre-defined control channel, an update to the plurality of channels available to the individual node.

11. A system, comprising:
    a network of at least one hub and a plurality of nodes;
    at least one processor in the network; and
    memory including instructions that, when executed by the at least one processor, cause the system to:
    for an individual node of the plurality of nodes and at a plurality of times points, determine first noise level in a plurality of channels of a frequency band, the plurality of channels available to the individual node;

determine, in the individual node, that a first set of the plurality of channels is available for transmission at the end of the plurality of time points and based at least in part on the first noise level;

provide, to the at least one hub, a listing of the first set of the plurality of channels;

determine, by the at least one hub, that a second set of the plurality of channels, from the first set of the plurality of channels, is unavailable for transmission based at least in part on measurements of second noise level by the hub;

eliminate the second set of the plurality of channels from the listing of the first set of the plurality of channels to provide a third set of the plurality of channels;

determine that additional nodes of the plurality of nodes provided a respective set of the plurality of channels in which respective unavailable channels are eliminated;

determine that the respective set of the plurality of channels include the third set of the plurality of channels;

associate count values for the respective set of the plurality of channels; and assign a select channel from the respective set of the plurality of channels to the individual node, the select channel for transmission by the individual node and having an associated count value that is a smallest value from the count values.

12. The system of claim 11, wherein the instructions that, when executed by the at least one processor, further cause the system to:
update the associated count value and the count values to reflect the assignment of the select channel.

13. The system of claim 12, wherein the instructions that, when executed by the at least one processor, further cause the system to:
determine a channel assignment for each of the plurality of nodes following the assignment of the select channel to the individual node, the channel assignment excluding further assignment of the select channel.

14. The system of claim 13, wherein the channel assignment for individual ones of the plurality of nodes is an ordered process beginning with the select channel assigned to the individual node and continuing with subsequent channels from the respective set of the plurality of channels that have an order of increasing values from the smallest value being assigned to a next node of the plurality of nodes till the individual node is reached.

15. The system of claim 14, wherein the instructions that, when executed by the at least one processor, further cause the system to:
assign subsequent channels having an order of increasing values from the smallest value to a next node of the plurality of nodes, the assigning causing a change in the count values for the respective set of the plurality of channels;

determine that there are remaining ones of the plurality of nodes that do not have an assigned channel;

sort the respective set of the plurality of channels by changed count values after the assigning of the subsequent channels has been completed to generate a sorted list with a new smallest count value among the changed count values;

assign to the remaining ones of the plurality of nodes a channel with the new smallest count value.

16. The system of claim 12, wherein the instructions that, when executed by the at least one processor, further cause the system to:
determine the plurality of channels available to the individual node based at least in part on at least one of a predetermined channel setting or a medium access protocol.

17. The system of claim 12, wherein a coordinator is operable to select a channel from the respective set of the plurality of channels for the individual node over the select channel to reduce contention in data communication.

18. The system of claim 17, the channel selected from the respective set of the plurality of channels for the individual node over the select channel is shared with another node.

19. The system of claim 12, wherein the instructions that, when executed by the at least one processor, further cause the system to:
transmit, by the individual node, signals that are at least in a frequency range corresponding to the select channel.

20. The system of claim 12, wherein the instructions that, when executed by the at least one processor, further cause the system to:
broadcast, by the individual node on a pre-defined control channel, an update to the plurality of channels available to the individual node.

* * * * *